Nov. 15, 1938.    R. SCHARINGER    2,136,805
CONDIMENT DISPENSER
Filed Oct. 27, 1936
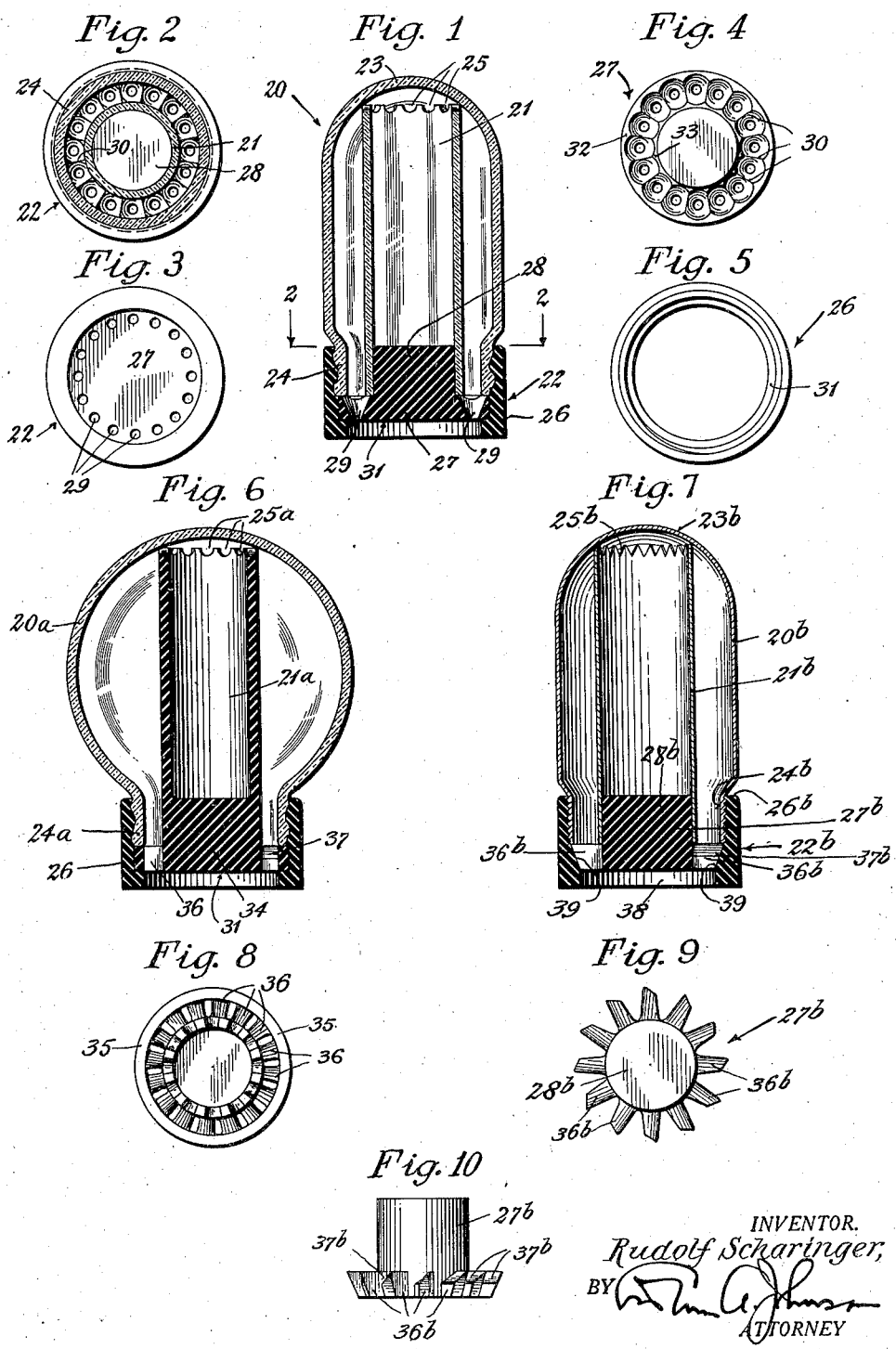
INVENTOR.
Rudolf Scharinger,
BY
ATTORNEY Patented Nov. 15, 1938

2,136,805

UNITED STATES PATENT OFFICE 2,136,805

CONDIMENT DISPENSER

Rudolf Scharinger, Bridgeport, Conn.

Application October 27, 1936, Serial No. 107,767

18 Claims. (Cl. 65—45)

This invention relates to containers and dispensers for powdered, granulated, or pulverized substances, such dispensers as salt shakers and the like, and more particularly to dispensers which are adapted to minimize the effect of atmospheric changes on the contents thereof.

Generally these devices operate to seal the contents from the outside air, when not in use, there being provided an inner container for said contents, and passages, normally sealed, through which the contents are sifted when the devices are used. Thus, when salt is used in such a dispenser, it is supposed to flow freely even on damp days.

In such devices as heretofore proposed difficulty was had not so much with sealing the contents of the dispenser from the outside air as with providing an organization which would adequately dispense and evenly distribute the contents with a minimum of shaking, yet which would permit of desirable economies in manufacture.

It is an object of the invention to provide a dispenser of this character which has an effective and yet inexpensive organization as just mentioned.

This object is attained by providing a novel inner container which has a notched upper edge adapted to engage the inner surface of an outer casing so as to allow the contents of the container to evenly sift out when the container and casing are gently shaken, and also by providing an improved supporting and strewing base which, while supporting the container and casing in proper position and serving to seal the contents thereof when not in use, permits free passage of the contents sifted from the container without the possibility of clogging. Thus, if the article be used as a salt shaker, the salt carried therein is not only not adversely affected during damp weather, but can be dispensed without trouble, and with an even, desirable distribution.

Other features and advantages will hereinafter appear.

In the accompanying drawing:

Figure 1 is a vertical axial section of the present preferred form of holder and dispenser.

Fig. 2 is a horizontal section taken on the line 2—2 of Fig. 1.

Fig. 3 is a bottom view of the dispenser of Fig. 1.

Fig. 4 is a top plan view of the supporting and dispensing member of the base.

Fig. 5 is a top view of the annular securing member of the base.

Fig. 6 is a vertical axial section of a modified form of the invention wherein the container is ball-shaped and wherein the inner container is made integral with the strew portion of the base.

Fig. 7 is a vertical axial section of another embodiment of the invention wherein the inner container and outer casing are made of formed metal; a modified form of base is also shown.

Fig. 8 is a top plan view of the inner container and integral strew portion of the base, of the modification of Fig. 6.

Fig. 9 is a top plan view of the supporting and dispensing member of the base shown in the embodiment of Fig. 7, and Fig. 10 is a side elevation of the member of Fig. 9.

Referring to Fig. 1, the present preferred embodiment of the invention is shown as having an outer casing 20, an inner container 21, and a supporting base structure 22. The casing 20 is preferably made of a transparent material such as glass, being tubular in shape, with its upper end closed by a spherical wall 23 and its lower end slightly reduced in diameter to form a neck 24 which is externally threaded as shown.

The container 21, which carries the granulated or powdered contents of the dispenser, is substantially tubular in shape. According to the invention, the upper end of the container is open and the edge thereof is provided with a plurality of notches 25, said edge being adapted to engage the inner surface of the top 23 of the casing. According to this organization passages are formed between the top edge of the container 21 and the inner surface of the casing 20, which passages permit a sifting of the granulated contents inside the container to the space between the walls of the container and the casing.

Also according to the invention there is provided an improved base for supporting the container 21 and the casing 20 in spaced relation as shown, and for permitting granular particles which are shaken from the container into the walled area between said container and the casing to pass out through the bottom thereof, and for sealing, when the dispenser is placed upon any flat surface, the openings therein communicating with said walled area so that moisture from the outside air can not gain access to the contents of the dispenser. This improved base 22 is preferably made of two parts, an outer securing annulus 26 and an inner supporting plate 27 provided with strew holes for distributing evenly the granulated articles. The securing annulus 26 has an upper portion which is internally threaded to screw over the neck 24 of the casing. The inner plate 27, see Figs. 1 and 4, is provided with a central boss 28 adapted to fit into the lower portion of the tubular container 21 to support same, said container being preferably cemented to the boss, and said plate is provided with a plurality of conical strew holes 29 disposed in a circle about the boss 28. These strew holes have their larger portions opening upward and are preferably closely spaced so that the walls of each hole intercept the walls of the holes adjacent thereto, forming curved sharp separating edges 30 as shown.

The plate 27 is adapted to fit within the annulus 26, so that the upper edge of said plate engages the lower edge of the neck 24 of the casing, and said annulus is provided with an internal flange or shoulder 31 at its lower edge adapted to engage the bottom outer edge of the plate so that when the annulus is screwed on the neck 24 the plate will be firmly gripped between the shoulder 31 and the lower edge of the neck.

It will be noted that the lower edge of the casing neck 24 and the tubular container 21 extend over the extreme outer and extreme inner portions of the strew holes 29, and this is an important feature of the invention since these edges therefore respectively cover the two circular fluted ledges 32 and 33 formed by the holes, one ledge at the outer edge of the plate 27, and the other directly adjacent and surrounding the boss 28. This positively prevents any granules from being stopped by these ledges, and therefore the granules will pass without hindrance through the base plate. It is to be noted also that, since the strew holes 29 are closely spaced, the sharp nature of the dividing edges 30 therebetween will serve to divide and sift the passing granules without hindering these. Referring to Fig. 2, it will be seen that by this entire organization there are no flat ledges between the neck 24 and the container 21 which could intercept the granules passing through the base, and prevent such passage.

When the dispenser is placed upon a flat surface, as that of a table, the bottom edge of the securing annulus 26 will, by its engagement with said surface, seal the contents of the dispenser against the outer atmosphere, and thus any moisture which might be carried in said atmosphere will not effect the granular contents in the container 21.

It should be understood that the base 22 may be formed of one piece if desired, and this will not depart from the spirit of the invention. However, at present it is preferred to form the base of two pieces, as described, so that it can be molded of Bakelite or other suitable material.

When the dispenser is to be used, as for table salt, the casing 20 is unscrewed from the base 22 and the container 21 filled about three quarters full of salt. The casing is then replaced, and when it is desired to strew the salt, as for seasoning food, it is merely necessary to grasp the dispenser in one hand, tilting it slightly in the natural manner, and shake it. This will cause salt from the container 21 to sift through the notches 25 into the walled area between said container and the casing and to drop downwardly and pass out through the strew holes 29. I have found that this causes an even distribution of salt, and that there is no tendency for the holes 29 to become clogged or for salt to remain in the walled area between the casing and the container, and also that the salt carried in said container is protected from moisture on damp days due to the sealing of the strew holes effected by engagement of the lower edge of the base with the flat surface upon which the dispenser is placed.

Another embodiment of the invention is shown in Figs. 6 and 8, wherein a modified form of casing is provided, and wherein the inner container is formed integral with the plate of the base. As shown, the outer casing 20a is substantially spherical in shape, having an open neck 24a at its bottom which is externally threaded and which is supported in the internally threaded securing annulus 26, which latter forms part of the base of the dispenser.

Within the casing 20a is provided a tubular container 21a, preferably molded of suitable material such as Bakelite, said container being open at the top and having an edge provided with notches 25a. The container 21a has a bottom 34, the lower portion of which carries a circular ring 35, see Fig. 8, which is secured to said bottom by radially extending ribs 36 as shown. The ring 35 is adapted to fit within the securing annulus 26 so as to engage the bottom internal flange 31 thereof and also engage the bottom edge of the neck 24a of the casing. Preferably the ribs 36 are beveled as at 37, Fig. 6, so that a sharp edge is presented to granular matter sifted from the container 21a and passing toward the base.

Still another embodiment of the invention is illustrated in Figs. 7 and 9, wherein the base is made of two parts, but wherein the container and casing are made of formed metal. As shown, the casing 20b is substantially tubular in shape having a round top 23b and a reduced lower neck portion 24b which is externally threaded.

Within the casing 20b is disposed a tubular metal container 21b having a notched top edge 25b engaging the inner surface of the casing top 23b.

The casing 20b and the container 21b are secured together by a base 22b having an outer securing flange 26b and an inner supporting and strew member 27b. The annulus 26b has an internally threaded bore at its upper portion, and a cylindrical and smaller bore 38 in the lowermost portion, and also has a sloping or conical bore 39 intermediate said threaded and cylindrical bore. The supporting member 27b of the base comprises a boss 28b adapted to extend into and support the container 21b, being preferably cemented thereto, and a plurality of radially extending arms 36b projecting from the lower portion of the boss. The arms 36b are beveled as at 37b to provide sharp upper edges to be presented to the falling granules of salt, and the outer ends of said arms slant inwardly downwardly so that the supporting member will fit within the securing annulus with the slanting ends of the arms engaging the conical bore of said annulus. The supporting member 27b is held in place by engagement of the lower edge of the threaded neck 24b with the upper edges of the arms 36b.

It will be noted that only the sharp edges of the arms 36b and the beveled surfaces 37b thereof are presented to the falling granules of salt, and therefore said granules are evenly sifted and pass freely through the base 22b.

Variations and modifications may be made within the scope of this invention and portions of the improvements may be used without others.

I claim:

1. A condiment dispenser comprising a substantially tubular outer casing closed at one end and open at the other; a tubular receptacle in said casing, having at one end a continuous serrated edge engaging the closed end of the casing; and means engaging the open end of the casing and the other end of the receptacle for supporting the latter in the casing in spaced relation with the side walls thereof, said means having a transversely extending wall provided with passages directly connecting the space between the casing and receptacle with the outer space surrounding the dispenser.

2. A condiment dispenser comprising a substantially tubular outer casing open at one end and having a substantially hemispherical endclosure at the other end; a tubular receptacle in said casing, having at one end a continuous notched edge engaging the hemispherical endclosure of the casing; and means engaging the open end of the casing and the other end of the receptacle for supporting the latter in the casing in spaced relation with the side walls thereof, said means having a transversely extending wall provided with passages directly connecting the space between the casing and receptacle with the outer space surrounding the dispenser.

3. A condiment dispenser comprising a substantially tubular outer casing closed at one end and open at the other; a tubular metal receptacle in said casing, having at one end a continuous sharp notched edge engaging the closed end of the casing; and means engaging the open end of the casing and the other end of the receptacle for supporting the latter in the casing in spaced relation with the side walls thereof, said means having a transversely extending wall provided with passages directly connecting the space between the casing and receptacle with the outer space surrounding the dispenser.

4. A condiment dispenser comprising a substantially bulbous outer casing closed at the top and open at the bottom; a tubular receptacle in said casing, open at the top adjacent the top of the casing; and a strew cap for said casing, adapted to support the receptacle therein in spaced relation with the side walls thereof, said cap having a disk-like end plate and a central boss carried thereby and adapted to extend into and hold the tubular receptacle at its bottom end, the end plate being provided with a plurality of apertures disposed about said boss, and said cap also having a circular flange extending from the edge of the plate and adapted to receive the open end of the casing and support same to enclose the tubular receptacle.

5. The invention as defined in claim 4, in which the apertures in the end plate have walls tapering so that the larger openings of said apertures are adjacent the boss carried by the plate.

6. The invention as defined in claim 4, in which the apertures in the end plate have walls tapering so that the larger openings of said apertures are adjacent the boss carried by the plate, and in which said apertures are disposed in a circle about the boss, and are closely placed so that the walls of each aperture intersect the walls of the apertures adjacent it, said intersections forming sharp dividing edges.

7. The invention as defined in claim 4, in which the apertures in the end plate have conically tapering walls, the larger openings of the apertures being adjacent the boss carried by the plate, said apertures being disposed in a circle about the boss and the walls of the apertures intersecting so that a ledge having a fluted surface is formed around the boss, and in which the tubular receptacle has walls sufficiently thick so that the bottom edge thereof, extending about the said boss, covers the outer edge of the ledge around the boss.

8. The invention as defined in claim 4, in which the apertures in the end plate have conically tapering walls, the larger openings of the apertures being adjacent the boss carried by the plate, said apertures being disposed in a circle about the boss, and the walls of the apertures intersecting so that a ledge having a fluted edge is formed around the boss, and a second ledge having a fluted edge is formed within the flange, and in which the tubular receptacle and the casing each has walls sufficiently thick so that the bottom edge of the receptacle, extending about the said boss, covers the ledge around the boss, and the bottom edge of the casing, extending within the flange of the cap, covers the ledge within the flange.

9. A condiment dispenser comprising a substantially bulbous outer casing closed at the top and open at the bottom; a tubular receptacle in said casing, open at the top adjacent the top of the casing; and a strew cap for said casing, adapted to support the receptacle therein in spaced relation with the side walls thereof, said cap having a disk-like end plate and a central boss carried thereby and adapted to extend into and hold the tubular receptacle at its bottom end, the end plate being provided with a plurality of apertures disposed about said boss, and said cap also having a pair of circular flanges extending from each side of the plate at the edge thereof, the flange adjacent the boss being adapted to receive the open end of the casing and support the latter thereby, and the other flange being adapted to engage a flat supporting surface so as to seal the space inside the flange.

10. A condiment dispenser comprising a substantially tubular outer casing closed at the top and open at the bottom; a tubular receptacle in said casing, open at the top adjacent the top of the casing; and a two-piece strew cap for said casing, adapted to support the receptacle therein in spaced relation with the side walls thereof, said cap having a disk-like end plate carrying an integral central boss adapted to extend into and hold the tubular receptacle at its bottom end, the plate being provided with a plurality of apertures disposed about said boss, and said cap having a separate securing annulus adapted to receive the end plate, the annulus having at one end an integral shoulder for engagement with the edge of the plate, and being adapted to receive into its other end the open bottom of the casing and support same to enclose the tubular receptacle 11. The invention as defined in claim 10, in which the bottom open end of the casing is externally threaded, and in which the annulus of the cap is internally threaded to screw over said casing end so that when the two are drawn up tight the end plate of the cap will be held firmly against the casing.

12. A condiment dispenser comprising a substantially spherical outer casing open at the bottom; a tubular receptacle in said casing having at its top end a continuous serrated edge engaging the inner surface of the casing; and means engaging the open bottom of the casing for supporting the receptacle in the casing in spaced relation with the inner side walls thereof, said means having a transversely extending wall provided with passages directly connecting the space between the casing and receptacle with the outer space surrounding the dispenser.

13. A condiment dispenser comprising a substantially bulbous outer casing closed at the top and open at the bottom; a tubular receptacle in said casing, open at the top adjacent the top of the casing, the bottom of said receptacle being closed and being provided with a mounting ring spaced therefrom and adapted to engage the open edge of the casing, and said bottom having a plurality of radial supporting ribs extending therefrom to the mounting ring, said ribs each having a sharp upper dividing edge; and a securing annulus adapted to receive the mounting ring, and having at one end an integral internal shoulder for engagement with said ring, and being adapted to receive into its other end the open bottom of the casing and support same to enclose the tubular receptacle.

14. The invention as defined in claim 13, in which the bottom open end of the casing is externally threaded, and in which the securing annulus is internally threaded to screw over said casing end so that when the two are drawn up tight the said mounting ring will be held firmly against the casing.

15. A condiment dispenser comprising a substantially bulbous outer casing closed at the top and open at the bottom; a tubular receptacle in said casing, open at the top adjacent the top of the casing; and a strew cap for said casing, adapted to support the receptacle therein in spaced relation with the side walls thereof, said cap having a central boss adapted to extend into and hold the tubular receptacle at its bottom end, and having a plurality of radial supporting arms extending from said boss, said arms each having a sharp upper dividing edge, and said cap also having a securing annulus connected with the extremities of the supporting arms, said annulus extending above the upper edges of the arms and being adapted to receive the open bottom of the casing and support same to enclose the tubular receptacle.

16. The invention as defined in claim 15, in which the annulus extends below the bottom edges of the arms and is adapted to engage a flat supporting surface so as to seal the space inside the annulus.

17. A condiment dispenser comprising a substantially bulbous outer casing closed at the top and open at the bottom; a tubular receptacle in said casing, open at the top adjacent the top of the casing, and having a closed bottom provided with a securing ring spaced therefrom and adapted to receive at one end the open bottom of the casing and support same to enclose the receptacle, and said bottom having a plurality of radial supporting ribs extending therefrom to said ring, each rib having a sharp upper dividing edge.

18. A condiment dispenser comprising a substantially tubular outer casing closed at the top and open at the bottom; a tubular receptacle in said casing, open at the top adjacent the top of the casing; and a two-piece strew cap for said casing, adapted to support the receptacle in spaced relation with the side walls thereof, said cap having a central boss adapted to extend into and hold the tubular receptacle at its bottom end, and having a plurality of integral radial supporting arms extending from said boss, said arms each having a sharp upper dividing edge, and having tapered ends, and said cap having a separate securing annulus adapted to receive the radial arms, the annulus having a tapered bore near its lower end for engagement with the tapered ends of said arms, and being adapted to receive in its upper end the open bottom of the casing and support same to enclose the tubular receptacle.

RUDOLF SCHARINGER.